US011843640B2

(12) United States Patent
Hodge et al.

(10) Patent No.: US 11,843,640 B2
(45) Date of Patent: *Dec. 12, 2023

(54) ELECTRONIC MESSAGING EXCHANGE

(71) Applicant: **Global Tel*Link Corporation**, Reston, VA (US)

(72) Inventors: Stephen Hodge, Aubrey, TX (US); David Woody, Allen, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,271

(22) Filed: Jul. 7, 2022

(65) Prior Publication Data

US 2022/0417290 A1    Dec. 29, 2022

Related U.S. Application Data

(63) Continuation of application No. 16/786,110, filed on Feb. 10, 2020, now Pat. No. 11,394,751, which is a
(Continued)

(51) Int. Cl.
*H04L 9/40* (2022.01)
*H04L 51/42* (2022.01)
(Continued)

(52) U.S. Cl.
CPC .............. *H04L 63/30* (2013.01); *H04L 51/04* (2013.01); *H04L 51/066* (2013.01);
(Continued)

(58) Field of Classification Search
CPC ......... H04L 63/30; H04L 51/58; H04L 51/42; H04L 51/56; H04L 51/214; H04L 51/212;
(Continued)

(56) References Cited

U.S. PATENT DOCUMENTS 4,054,756 A    10/1977  Comella et al.
4,191,860 A     3/1980  Weber
(Continued)

FOREIGN PATENT DOCUMENTS

EP    0989720 A1    3/2000
GB    2400284 A    10/2004
(Continued)

OTHER PUBLICATIONS

"Cisco IAD2400 Series Business-Class Integrated Access Device", Cisco Systems Datasheet, 2003.
(Continued)

*Primary Examiner* — Shanto Abedin
(74) *Attorney, Agent, or Firm* — Sterne, Kessler, Goldstein & Fox P.L.L.C.

(57) ABSTRACT

A computer-implemented system and method for secure electronic message exchange including coupling a control platform to a workstation of a plurality of workstations via a communications medium, where the control platform includes one or more apparatuses for monitoring, controlling, conversion, and billing, related to messages exchanged between a plurality of local users and a plurality of remote users. The system prevents forwarding or copying of a message sent by a local user of the plurality of local users and received by a remote user of the plurality of remote users, to another party by the control platform. The system and method also provides for authenticating the remote user with the control platform.

20 Claims, 7 Drawing Sheets

Related U.S. Application Data continuation of application No. 16/175,202, filed on Oct. 30, 2018, now Pat. No. 10,560,488, which is a continuation of application No. 15/974,108, filed on May 8, 2018, now Pat. No. 10,116,707, which is a continuation of application No. 15/606,818, filed on May 26, 2017, now Pat. No. 9,967,291, which is a continuation of application No. 15/259,439, filed on Sep. 8, 2016, now Pat. No. 9,667,663, which is a continuation of application No. 14/457,593, filed on Aug. 12, 2014, now Pat. No. 9,807,123, which is a continuation of application No. 13/941,382, filed on Jul. 12, 2013, now Pat. No. 9,680,878, which is a continuation of application No. 12/802,641, filed on Jun. 10, 2010, now Pat. No. 8,488,756, which is a continuation of application No. 10/996,795, filed on Nov. 24, 2004, now Pat. No. 7,742,581.

(51) Int. Cl.
| | |
|---|---|
| *H04L 51/56* | (2022.01) |
| *H04L 51/58* | (2022.01) |
| *H04L 51/212* | (2022.01) |
| *H04L 51/214* | (2022.01) |
| *H04L 51/066* | (2022.01) |
| *H04L 51/04* | (2022.01) |
| *H04M 3/42* | (2006.01) |
| *H04L 67/02* | (2022.01) |
| *H04L 67/306* | (2022.01) |
| *H04M 3/22* | (2006.01) |
| *H04W 48/02* | (2009.01) |

(52) U.S. Cl.
CPC .......... *H04L 51/212* (2022.05); *H04L 51/214* (2022.05); *H04L 51/42* (2022.05); *H04L 51/56* (2022.05); *H04L 51/58* (2022.05); *H04L 63/08* (2013.01); *H04L 63/083* (2013.01); *H04L 63/0861* (2013.01); *H04L 63/102* (2013.01); *H04L 63/105* (2013.01); *H04L 63/1408* (2013.01); *H04M 3/42382* (2013.01); *H04L 63/0892* (2013.01); *H04L 67/02* (2013.01); *H04L 67/306* (2013.01); *H04M 3/2281* (2013.01); *H04W 48/02* (2013.01)

(58) Field of Classification Search
CPC ....... H04L 51/04; H04L 51/066; H04L 63/08; H04L 63/083; H04L 63/0861; H04L 63/102; H04L 63/105; H04L 63/1408
See application file for complete search history.

(56) References Cited

U.S. PATENT DOCUMENTS

| | | |
|---|---|---|
| 4,652,700 A | 3/1987 | Matthews et al. |
| 4,766,604 A | 8/1988 | Axberg |
| 4,935,956 A | 6/1990 | Hellwarth et al. |
| 5,068,888 A | 11/1991 | Scherk et al. |
| 5,319,702 A | 6/1994 | Kitchin et al. |
| 5,351,287 A | 9/1994 | Bhattacharyya et al. |
| 5,535,261 A | 7/1996 | Brown et al. |
| 5,539,812 A | 7/1996 | Kitchin et al. |
| 5,553,145 A | 9/1996 | Micali |
| 5,648,916 A | 7/1997 | Manduley |
| 5,655,013 A | 8/1997 | Gainsboro |
| 5,705,995 A | 1/1998 | Lafflin et al. |
| 5,740,231 A | 4/1998 | Cohn et al. |
| 5,745,558 A | 4/1998 | Richardson, Jr. et al. |
| 5,768,355 A | 6/1998 | Salibrici et al. |
| 5,778,313 A | 7/1998 | Fougnies |
| 5,805,810 A | 9/1998 | Maxwell |
| 5,826,034 A | 10/1998 | Albal |
| 5,838,790 A | 11/1998 | McAuliffe et al. |
| 5,848,397 A | 12/1998 | Marsh et al. |
| 5,854,975 A | 12/1998 | Fougnies et al. |
| 5,872,926 A | 2/1999 | Levac et al. |
| 5,894,558 A | 4/1999 | Falker |
| 5,937,037 A | 8/1999 | Kamel et al. |
| 5,956,717 A | 9/1999 | Kraay et al. |
| 5,958,005 A | 9/1999 | Thorne et al. |
| 5,982,506 A | 11/1999 | Kara |
| 5,987,611 A | 11/1999 | Freund |
| 6,002,689 A | 12/1999 | Christie |
| 6,035,327 A | 3/2000 | Buckley et al. |
| 6,052,454 A | 4/2000 | Kek et al. |
| 6,061,718 A | 5/2000 | Nelson |
| 6,064,963 A | 5/2000 | Gainsboro |
| 6,067,514 A | 5/2000 | Chen |
| 6,092,192 A | 7/2000 | Kanevsky et al. |
| 6,097,791 A | 8/2000 | Ladd et al. |
| 6,137,864 A | 10/2000 | Yaker |
| 6,145,004 A | 11/2000 | Walsh |
| 6,151,679 A | 11/2000 | Friedman et al. |
| 6,161,139 A | 12/2000 | Win et al. |
| 6,173,259 B1 | 1/2001 | Bijl et al. |
| 6,173,284 B1 | 1/2001 | Brown |
| 6,192,114 B1 | 2/2001 | Council |
| 6,226,362 B1 | 5/2001 | Gerszberg et al. |
| 6,226,363 B1 | 5/2001 | Miller |
| 6,233,313 B1 | 5/2001 | Farris et al. |
| 6,233,318 B1 | 5/2001 | Picard et al. |
| 6,246,871 B1 | 6/2001 | Ala-Laurila |
| 6,249,808 B1 | 6/2001 | Seshadri |
| 6,285,777 B2 | 9/2001 | Kanevsky et al. |
| 6,304,636 B1 | 10/2001 | Goldberg et al. |
| 6,356,867 B1 | 3/2002 | Gabai et al. |
| 6,363,414 B1 | 3/2002 | Nicholls et al. |
| 6,366,651 B1 | 4/2002 | Griffith et al. |
| 6,389,276 B1 | 5/2002 | Brilla et al. |
| 6,400,272 B1 | 6/2002 | Holtzman et al. |
| 6,411,685 B1 | 6/2002 | O'Neal |
| 6,477,492 B1 | 11/2002 | Connor |
| 6,490,611 B1 | 12/2002 | Shen et al. |
| 6,493,447 B1 | 12/2002 | Goss et al. |
| 6,526,335 B1 | 2/2003 | Treyz et al. |
| 6,560,323 B2 | 5/2003 | Gainsboro |
| 6,570,970 B2 | 5/2003 | Gruchala et al. |
| 6,591,367 B1 | 7/2003 | Kobata et al. |
| 6,603,838 B1 | 8/2003 | Brown et al. |
| 6,606,648 B1 | 8/2003 | Mukundan et al. |
| 6,611,583 B1 | 8/2003 | Gainsboro |
| 6,639,977 B1 | 10/2003 | Swope et al. |
| 6,665,378 B1 | 12/2003 | Spielman et al. |
| 6,665,380 B1 | 12/2003 | Cree et al. |
| 6,668,045 B1 * | 12/2003 | Mow .............. H04M 15/58 379/88.19 |
| 6,681,114 B2 | 1/2004 | Chang et al. |
| 6,684,248 B1 | 1/2004 | Janacek et al. |
| 6,714,982 B1 | 3/2004 | McDonough et al. |
| 6,775,359 B1 | 8/2004 | Ron et al. |
| 6,788,771 B2 | 9/2004 | Manto |
| 6,801,932 B1 | 10/2004 | Picoult et al. |
| 6,819,932 B2 | 11/2004 | Allison et al. |
| 6,850,147 B2 | 2/2005 | Prokoski et al. |
| 6,857,024 B1 | 2/2005 | Chen et al. |
| 6,865,260 B1 | 3/2005 | Meadows et al. |
| 6,879,677 B2 | 4/2005 | Trandal et al. |
| 6,950,502 B1 | 9/2005 | Jenkins |
| 7,003,308 B1 | 2/2006 | Fuoss et al. |
| 7,013,002 B2 | 3/2006 | Link et al. |
| 7,039,071 B2 | 5/2006 | Pekonen |
| 7,039,171 B2 | 5/2006 | Gickler |
| 7,039,949 B2 | 5/2006 | Cartmell et al. |
| 7,046,779 B2 | 5/2006 | Hesse |
| 7,058,163 B1 | 6/2006 | Parekh et al. |
| 7,079,636 B1 | 7/2006 | McNitt et al. |
| 7,085,359 B2 | 8/2006 | Crites et al. |
| 7,095,829 B2 | 8/2006 | Claudatos et al. |
| 7,106,843 B1 | 9/2006 | Gainsboro et al. |
| 7,136,462 B2 | 11/2006 | Pelaez et al. |

(56) References Cited

U.S. PATENT DOCUMENTS

| | | |
|---|---|---|
| 7,158,621 B2 | 1/2007 | Bayne |
| 7,197,560 B2 | 3/2007 | Caslin et al. |
| 7,248,680 B1 | 7/2007 | Gainsboro |
| 7,256,816 B2 | 8/2007 | Profanchik et al. |
| 7,260,383 B1 | 8/2007 | Ngan |
| 7,265,853 B1 | 9/2007 | Kara et al. |
| 7,277,695 B2 | 10/2007 | Petry et al. |
| 7,278,028 B1 | 10/2007 | Hingoranee |
| 7,333,798 B2 | 2/2008 | Hodge |
| 7,359,494 B2 | 4/2008 | Leonard |
| 7,363,302 B2 | 4/2008 | Lester |
| 7,496,345 B1 | 2/2009 | Rae et al. |
| 7,505,406 B1 | 3/2009 | Spadaro et al. |
| 7,519,076 B2 | 4/2009 | Janssen et al. |
| 7,551,732 B2 | 6/2009 | Anders |
| 7,561,679 B1 | 7/2009 | Kalbag |
| 7,561,680 B1 | 7/2009 | Falcone et al. |
| 7,565,687 B2 | 7/2009 | Noguchi et al. |
| 7,583,974 B2 | 9/2009 | Benco et al. |
| 7,651,680 B2 | 1/2010 | Breton et al. |
| 7,664,689 B1 * | 2/2010 | Rosenfield ............ G06Q 20/108 705/35 |
| 7,673,058 B1 | 3/2010 | White et al. |
| 7,681,032 B2 | 3/2010 | Peled et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,881,446 B1 | 2/2011 | Apple et al. |
| 7,899,167 B1 | 3/2011 | Rae |
| 8,000,269 B1 | 8/2011 | Rae et al. |
| 8,014,800 B2 | 9/2011 | Törnkvist |
| 8,130,919 B2 | 3/2012 | Kalbag |
| 8,190,121 B2 | 5/2012 | Smith et al. |
| 8,204,177 B2 | 6/2012 | Harper |
| 8,218,736 B1 | 7/2012 | McClintock et al. |
| 8,232,862 B2 | 7/2012 | Lowe |
| 8,238,534 B2 | 8/2012 | Link et al. |
| 8,243,891 B2 | 8/2012 | Hodge et al. |
| 8,255,300 B2 | 8/2012 | Polozola et al. |
| 8,458,732 B2 | 6/2013 | Hanna et al. |
| 8,488,756 B2 | 7/2013 | Hodge et al. |
| 8,509,390 B2 | 8/2013 | Harper |
| 8,515,031 B2 | 8/2013 | Hodge et al. |
| 8,577,003 B2 | 11/2013 | Rae |
| 8,626,118 B2 | 1/2014 | Smith et al. |
| 8,725,115 B2 | 5/2014 | Liu et al. |
| 8,838,622 B2 | 9/2014 | Irving et al. |
| 9,043,813 B2 | 5/2015 | Hanna et al. |
| 9,077,680 B2 | 7/2015 | Harper |
| 9,282,188 B2 | 3/2016 | Hodge et al. |
| 9,306,883 B2 | 4/2016 | Hodge et al. |
| 9,621,714 B2 | 4/2017 | Seyfetdinov |
| 9,667,663 B2 | 5/2017 | Hodge et al. |
| 9,680,878 B2 | 6/2017 | Hodge et al. |
| 9,680,879 B2 | 6/2017 | Hodge et al. |
| 9,692,718 B2 | 6/2017 | Bennett |
| 9,757,032 B2 | 9/2017 | Gross et al. |
| 9,787,724 B2 | 10/2017 | Hodge et al. |
| 9,807,123 B2 | 10/2017 | Hodge et al. |
| 9,871,915 B2 | 1/2018 | Hodge et al. |
| 9,876,915 B2 | 1/2018 | Hodge et al. |
| 9,923,932 B2 | 3/2018 | Hodge et al. |
| 9,967,291 B1 | 5/2018 | Hodge et al. |
| 10,116,707 B2 | 10/2018 | Hodge et al. |
| 10,218,842 B2 | 2/2019 | Hodge et al. |
| 10,397,410 B2 | 8/2019 | Hodge et al. |
| 10,560,488 B2 | 2/2020 | Hodge et al. |
| 10,749,827 B2 | 8/2020 | Hodge |
| 10,757,265 B2 | 8/2020 | Seyfetdinov |
| 11,394,751 B2 | 7/2022 | Hodge et al. |
| 2001/0036821 A1 | 11/2001 | Gainsboro et al. |
| 2002/0007453 A1 | 1/2002 | Nemovicher |
| 2002/0054674 A1 | 5/2002 | Chang et al. |
| 2002/0071537 A1 | 6/2002 | Gainsboro |
| 2002/0111887 A1 | 8/2002 | McFarlane et al. |
| 2002/0159600 A1 | 10/2002 | Weiner |
| 2002/0183040 A1 | 12/2002 | Lundstrom et al. |
| 2003/0002639 A1 | 1/2003 | Huie |
| 2003/0009333 A1 | 1/2003 | Sharma et al. |
| 2003/0070076 A1 | 4/2003 | Michael |
| 2003/0083041 A1 | 5/2003 | Kumar et al. |
| 2003/0086546 A1 | 5/2003 | Falcone et al. |
| 2003/0099337 A1 | 5/2003 | Lord |
| 2003/0126470 A1 | 7/2003 | Crites et al. |
| 2003/0142364 A1 | 7/2003 | Goldstone |
| 2003/0187939 A1 | 10/2003 | O'Brien |
| 2003/0198325 A1 | 10/2003 | Bayne |
| 2003/0200078 A1 | 10/2003 | Luo et al. |
| 2003/0216983 A1 | 11/2003 | Bodin |
| 2004/0029564 A1 | 2/2004 | Hodge |
| 2004/0058667 A1 | 3/2004 | Pienmaki et al. |
| 2004/0076272 A1 | 4/2004 | Zafar et al. |
| 2004/0081296 A1 | 4/2004 | Brown et al. |
| 2004/0114740 A1 * | 6/2004 | Gickler ................ G06F 21/552 379/93.01 |
| 2004/0120475 A1 | 6/2004 | Bauer et al. |
| 2004/0196963 A1 | 10/2004 | Appelman et al. |
| 2004/0202327 A1 | 10/2004 | Little et al. |
| 2004/0235520 A1 | 11/2004 | Cadiz et al. |
| 2004/0236838 A1 | 11/2004 | Tout |
| 2004/0252447 A1 | 12/2004 | Hesse et al. |
| 2005/0010573 A1 | 1/2005 | Garg |
| 2005/0055411 A1 | 3/2005 | Bouchard |
| 2005/0078612 A1 | 4/2005 | Lang |
| 2005/0080868 A1 | 4/2005 | Malik |
| 2005/0094794 A1 | 5/2005 | Creamer et al. |
| 2005/0114192 A1 | 5/2005 | Tor et al. |
| 2005/0125226 A1 | 6/2005 | Magee |
| 2005/0207341 A1 | 9/2005 | Zhang |
| 2005/0265322 A1 | 12/2005 | Hester |
| 2005/0286498 A1 | 12/2005 | Rand et al. |
| 2005/0287993 A1 | 12/2005 | Gogic |
| 2006/0062355 A1 | 3/2006 | Leonard |
| 2006/0087554 A1 | 4/2006 | Boyd et al. |
| 2006/0098796 A1 | 5/2006 | Link |
| 2006/0149644 A1 | 7/2006 | Sulmar et al. |
| 2006/0168015 A1 | 7/2006 | Fowler |
| 2006/0245552 A1 | 11/2006 | Hayashi |
| 2006/0245559 A1 | 11/2006 | Hodge et al. |
| 2006/0245579 A1 | 11/2006 | Bienfait et al. |
| 2007/0041545 A1 | 2/2007 | Gainsboro |
| 2007/0044734 A1 | 3/2007 | Maloney et al. |
| 2007/0155411 A1 | 7/2007 | Morrison |
| 2007/0165790 A1 | 7/2007 | Taori et al. |
| 2007/0195751 A1 | 8/2007 | Cai et al. |
| 2007/0207785 A1 | 9/2007 | Chatterjee et al. |
| 2007/0233610 A1 | 10/2007 | Gyllenskog et al. |
| 2007/0239898 A1 | 10/2007 | Friend et al. |
| 2007/0263853 A1 | 11/2007 | Pearson et al. |
| 2007/0283006 A1 | 12/2007 | Hong |
| 2008/0037722 A1 | 2/2008 | Klassen |
| 2008/0126951 A1 | 5/2008 | Sood et al. |
| 2008/0200152 A1 | 8/2008 | Moore |
| 2008/0219414 A1 | 9/2008 | Ramamoorthy et al. |
| 2008/0249778 A1 | 10/2008 | Barton et al. |
| 2008/0260118 A1 | 10/2008 | Lyle |
| 2009/0054031 A1 | 2/2009 | Smith et al. |
| 2009/0086631 A1 | 4/2009 | Jayapalan et al. |
| 2009/0086936 A1 | 4/2009 | Clifford et al. |
| 2009/0197622 A1 | 8/2009 | Atarius |
| 2009/0201886 A1 | 8/2009 | Lee et al. |
| 2009/0203361 A1 | 8/2009 | Huang et al. |
| 2009/0274279 A1 | 11/2009 | Reynolds |
| 2010/0023472 A1 | 1/2010 | Loeb |
| 2010/0054433 A1 | 3/2010 | Gustave et al. |
| 2010/0056110 A1 | 3/2010 | Liu et al. |
| 2010/0138357 A1 | 6/2010 | Mufti-Bey |
| 2010/0153114 A1 | 6/2010 | Shih et al. |
| 2010/0189228 A1 | 7/2010 | Seyfetdinov |
| 2010/0241663 A1 | 9/2010 | Huang et al. |
| 2010/0254263 A1 | 10/2010 | Chen et al. |
| 2010/0299761 A1 | 11/2010 | Shapiro |
| 2010/0318441 A1 | 12/2010 | Harper |

(56) References Cited

U.S. PATENT DOCUMENTS

| | | |
|---|---|---|
| 2011/0106894 A1 | 5/2011 | Hodge et al. |
| 2011/0286585 A1 | 11/2011 | Hodge |
| 2011/0286591 A1 | 11/2011 | Fulton et al. |
| 2012/0094680 A1 | 4/2012 | Stackelius et al. |
| 2012/0202454 A1 | 8/2012 | Smith et al. |
| 2013/0058274 A1 | 3/2013 | Scherzer et al. |
| 2013/0162423 A1 | 6/2013 | Rowe et al. |
| 2013/0179949 A1 | 7/2013 | Shapiro |
| 2013/0246535 A1 | 9/2013 | Yadava et al. |
| 2014/0020063 A1 | 1/2014 | Hodge et al. |
| 2014/0044242 A1 | 2/2014 | Hodge et al. |
| 2014/0280631 A1 | 9/2014 | Torgersrud |
| 2015/0043721 A1 | 2/2015 | Hodge et al. |
| 2015/0046978 A1 | 2/2015 | Hodge et al. |
| 2015/0047004 A1 | 2/2015 | Hodge et al. |
| 2015/0066523 A1 | 3/2015 | Pan |
| 2015/0103990 A1 | 4/2015 | Lee |
| 2015/0181489 A1 | 6/2015 | Chong et al. |
| 2015/0201080 A1 | 7/2015 | Hodge et al. |
| 2015/0201081 A1 | 7/2015 | Hodge et al. |
| 2015/0215254 A1 | 7/2015 | Bennett |
| 2015/0223705 A1 | 8/2015 | Sadhu |
| 2016/0142537 A1 | 5/2016 | Hodge et al. |
| 2016/0156625 A1 | 6/2016 | Hodge et al. |
| 2016/0381082 A1 | 12/2016 | Hodge et al. |
| 2017/0127257 A1 | 5/2017 | Saxena et al. |
| 2017/0142258 A1 | 5/2017 | Seyfetdinov |
| 2017/0279857 A1 | 9/2017 | Hodge et al. |
| 2017/0302756 A1 | 10/2017 | Chou et al. |
| 2017/0324834 A1 | 11/2017 | Hodge |
| 2018/0213090 A1 | 7/2018 | Hodge et al. |
| 2018/0331987 A1 | 11/2018 | Hodge |
| 2019/0132364 A1 | 5/2019 | Hodge et al. |
| 2021/0021554 A1 | 1/2021 | Hodge |
| 2021/0021708 A1 | 1/2021 | Seyfetdinov |
| 2021/0377317 A1 | 12/2021 | Hodge |

FOREIGN PATENT DOCUMENTS

| | | |
|---|---|---|
| WO | WO 99/21330 A1 | 4/1999 |
| WO | WO 99/48054 A1 | 9/1999 |

OTHER PUBLICATIONS

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

"Criminal Calls: A Review of the Bureau of Prisons' Management of Inmate Telephone Privileges," U.S. Department of Justice, Office of the Inspector General, Aug. 1999.

"Why Can't You Make a Collect Call to a Cell Phone," National Public Radio, Jun. 30, 2008, Accessed via http://www.npr.org/templates/story/story.php?storyId=92021561 on Apr. 6, 2015.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.

Advanced Technologies Group, Inc, White Paper: Introduction to Advanced Technologies Group, Inc., Inmate Correspondence System, Aug. 5, 2002, American Corrections Association Annual Conference, Anaheim, California.

Advanced Technologies Group, Inc., Correspondence System Poster, published Jul. 29, 2002 by Exhibit-Resources Midwest, displayed at Aug. 2002 American Corrections Association Annual Conference, Anaheim, California.

Advanced Technologies Group, Inc., Offender Management Suite: Correspondence System Brochure, printing invoice dated Aug. 2, 2002, brochure distributed at Aug. 2002 American Corrections Association Annual Conference, Anaheim, California.

Ahimovic et al., "Services for Tomorrow's PCS," IEEE International Conference on Universal Personal Communications, vol. 1, Oct. 12-15, 1993; pp. 222-227.

Assignment of U.S. Pat. No. 8,190,121 and U.S. Appl. No. 13/449,308.

Avtalion, J., "Keeping tabs on call centres," Telecommunications, vol. 31, No. 7, Jul. 1997, pp. 70-72.

Brown, et al., "SMS: The Short Message Service," Computer, vol. 40, No. 12, 2007.

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Clifford J. Weinstein, MIT, The Experimental Integrated Switched Network—A System-Level Network Test Facility (IEEE 1983).

Commander Call Control System, Rev. 1.04 (Science Dynamics 2002).

Confalone et al., "Calling Card Service—TSPS Hardware, Software, and Signaling Implementation," The Bell System Technical Journal, Sep. 1982, vol. 61, No. 7; pp. 1675-1714.

Creps, et al., "Is somebody watching? Employee communications and privacy," Risk Management vol. 44, No. 4, Apr. 1997, pp. 22-28.

Definition of "telephony", McGraw-Hill Dictionary of Scientific and Technical Terms, 6th Edition (McGraw-Hill, 2003).

Definitions of "Local Area Network (LAN)" and "Wide Area Network (WAN)," Microsoft Computer Dictionary (Microsoft Press 2002), pp. 304-561.

Digital Copy of "Bellcore Notes on the Networks," Bellcore, Special Report SR-2275, Issue 3, Dec. 1997.

English-language Abstract for European Patent Publication No. 0989720 A1; 2 pages.

Excerpts from Provisional Patent Application No. 60,538,933 to Shapiro, filed Jan. 22, 2004, 7 pages.

Excerpts from the Prosecution History of U.S. Appl. No. 10/135,878, filed Apr. 29, 2002.

File History of U.S. Pat. No. 7,899,167, U.S. Appl. No. 10/642,532, filed Aug. 15, 2003.

File History of U.S. Pat. No. 8,190,121, U.S. Appl. No. 12/103,138, filed Apr. 15, 2008.

File History of U.S. Pat. No. 8,515,031, U.S. Appl. No. 13/584,295, filed Aug. 13, 2012.

File History of U.S. Pat. No. 8,577,003, U.S. Appl. No. 13/009,483, filed Jan. 19, 2011.

File History of U.S. Pat. No. 8,626,118, U.S. Appl. No. 13/449,308, filed Apr. 17, 2012.

Reexamination Application No. 90/012,802 of U.S. Pat. No. 8,190,121, filed Mar. 1, 2013.

Garner, et al., "Mobile Terminated SMS Billing—Exploits and Security Analysis," IEEE International Conference on Information Technology: New Generations, 2006.

Henry, M., "Unethical staff behavior," Corrections Today, vol. 60, No. 3, Jun. 1, 1998.

International Search Report and Written Opinion directed to International Patent Application No. PCT/US2016/018653, dated May 30, 2016; 11 pages.

International Search Report and Written Opinion directed to International Patent Application No. PCT/US2017/031321, dated Jul. 14, 2017; 13 pages.

Jeff Hewett and Lee Dryburgh, Signaling System No. 7 (SS7/C7): Protocol, Architecture, and Services (Networking Technology) at 85 (Cisco Press, Jun. 2005).

Joint Claim Construction and Prehearing Statement, Exhibit B: Securus' Intrinsic and Extrinsic Evidence Charts, *Global Tel*Link Corporation* v. *Securus Technologies, Inc.*, No. 3:14-cv-00829-K (N.D. Tex.), Sep. 26, 2014.

Maghan, J., "Intelligence Gathering Approaches in Prisons," Low Intensity Conflict & Law Enforcement, vol. 3. No. 3, 1994, pp. 548-557.

McKitterick et al., "State of the Art Review of Mobile Payment Technology," Department of Computer Science, Trinity College Dublin; 22 pages.

(56) References Cited

OTHER PUBLICATIONS

Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Photocopy of "Bellcore Notes on the Networks (Formerly BOC Notes on the LEC Networks)," Bellcore, Special Report SR-2275, Issue 3, Dec. 1997.
Procops, T., "Advanced call logging for public safety organizations," Public Management, vol. 82, vol. 3, Mar. 2000, pp. 17-19.
Prosecution History of U.S. Appl. No. 11/045,589, filed Jan. 28, 2005.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001.
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearer, G., "How logging and monitoring technologies improve quality in a call center," Telemarketing & Call Center Solutions, vol. 16, No. 7, Jan. 1998, pp. 92-101.
Smith, M., "Corrections Turns Over a New LEAF: Correctional Agencies Receive Assistance From the Law Enforcement Analysis Facility," Corrections Today, Oct. 1, 2001.
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 12/103,138, "System and Method for Authorizing and Monetizing Collect Cellular Telephone Calls," to Smith et al., filed Apr. 15, 2008.
U.S. Appl. No. 13/449,308, "System and Method for Authorizing and Monetizing Collect Cellular Telephone Calls," to Smith et al., filed Apr. 17, 2012.
U.S. Appl. No. 15/288,520, "Electronic Messaging Device," to Hodge et al., filed Oct. 7, 2016.
U.S. Appl. No. 60/036,689, filed Jan. 31, 1997, titled Database Origami.
U.S. Appl. No. 60/246,070, "Employee Online Activity Monitoring System," to Mcfarlane, et al., filed Nov. 7, 2000.
U.S. Appl. No. 60/500,725, "SMS Message Processing," to Claudatos, filed Sep. 4, 2003.
U.S. Appl. No. 60/607,447, "IP-based telephony system and method," to Apple, et al., filed Sep. 3, 2004.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

Valcourt, et al., "Investigating mobile payment: Supporting technologies, methods, and use," IEEE International Conference on Wireless and Mobile Computing, Networking, and Communications, 2005.
Web pages from "Electronic Message Solutions Inc. (EMS): Improving Relationships through faster Correspondence," 2004, 9 pages; retrieved from http://www.inmatemail.com.
Wenndt, et al., "Content recognition for telephone monitoring," Proceedings of the SPIE—The International Society for Optical Engineering, vol. 4232, 2001, pp. 274-280.
Wireless Interconnection and Reciprocal Compensation Agreement Between Community Telephone Company and United States Cellular Corporation, Apr. 24, 2006; 29 pages.
Definition of "circuit switching", Newton's Telecom Dictionary, 10th Edition, 1996.
Final Office Action directed to U.S. Appl. No. 10/966,795, dated May 28, 2008; 15 pages.
Final Office Action directed to U.S. Appl. No. 13/941,382, dated Dec. 11, 2014; 13 pages.
Final Office Action directed to U.S. Appl. No. 13/941,382, dated Dec. 30, 2016; 15 pages.
Final Office Action directed to U.S. Appl. No. 13/941,382, dated May 24, 2016; 13 pages.
Final Office Action directed to U.S. Appl. No. 14/457,593, dated Aug. 22, 2016; 12 pages.
Final Office Action directed to U.S. Appl. No. 14/457,593, dated Dec. 14, 2015; 13 pages.
Final Office Action directed to U.S. Appl. No. 14/457,604, dated Aug. 18, 2016; 10 pages.
Final Office Action directed to U.S. Appl. No. 14/457,604, dated Sep. 30, 2015; 9 pages.
Final Office Action directed to U.S. Appl. No. 14/457,616, dated Oct. 1, 2015; 8 pages.
Final Office Action directed to U.S. Appl. No. 15/003,504, dated Feb. 21, 2017; 19 pages.
Non-Final Office Action directed to U.S. Appl. No. 10/966,795, dated Jul. 13, 2007; 10 pages.
Non-Final Office Action directed to U.S. Appl. No. 10/966,795, dated Jun. 16, 2009; 8 pages.
Non-Final Office Action directed to U.S. Appl. No. 10/966,795, dated Mar. 20, 2009; 14 pages.
Non-Final Office Action directed to U.S. Appl. No. 10/966,795, dated Nov. 14, 2008; 18 pages.
Non-Final Office Action directed to U.S. Appl. No. 10/966,795, dated Sep. 28, 2009; 8 pages.
Non-Final Office Action directed to U.S. Appl. No. 12/802,641, dated Dec. 11, 2012; 4 pages.
Non-Final Office Action directed to U.S. Appl. No. 12/802,641, dated Jan. 26, 2012; 4 pages.
Non-Final Office Action directed to U.S. Appl. No. 12/802,641, dated Sep. 5, 2012; 5 pages.
Non-Final Office Action directed to U.S. Appl. No. 13/941,382, dated Jun. 5, 2015; 11 pages.
Non-Final Office Action directed to U.S. Appl. No. 13/941,382, dated Sep. 5, 2014; 14 pages.
Non-Final Office Action directed to U.S. Appl. No. 14/457,593, dated Jun. 10, 2015; 10 pages.
Non-Final Office Action directed to U.S. Appl. No. 14/457,604, dated Jul. 1, 2015; 7 pages.
Non-Final Office Action directed to U.S. Appl. No. 14/457,616, dated Jun. 29, 2015; 8 pages.
Non-Final Office Action directed to U.S. Appl. No. 13/941,382, dated Dec. 10, 2015; 10 pages.
Non-Final Office Action directed to U.S. Appl. No. 13/941,382, dated Sep. 7, 2016; 13 pages.
Non-Final Office Action directed to U.S. Appl. No. 14/457,604, dated Feb. 5, 2016; 9 pages.
Non-Final Office Action directed to U.S. Appl. No. 14/457,593, dated Dec. 29, 2016; 12 pages.
Non-Final Office Action directed to U.S. Appl. No. 14/457,593, dated Mar. 30, 2016; 11 pages.
Non-Final Office Action directed to U.S. Appl. No. 15/003,504, dated Sep. 2, 2016; 15 pages.

(56) References Cited

OTHER PUBLICATIONS

Non-Final Office Action directed to U.S. Appl. No. 15/259,439, dated Dec. 12, 2016; 9 pages.
Non-Final Office Action directed to U.S. Appl. No. 15/288,520, dated Jan. 5, 2017; 26 pages.
Notice of Allowance directed to U.S. Appl. No. 10/996,795, dated Feb. 4, 2010; 6 pages.
Notice of Allowance directed to U.S. Appl. No. 12/802,641, dated Mar. 18, 2013; 6 pages.
Notice of Allowance directed to U.S. Appl. No. 14/457,616, dated Jan. 28, 2016; 8 pages.
Notice of Allowance directed to U.S. Appl. No. 13/941,382, dated Mar. 28, 2017; 7 pages.
Notice of Allowance directed to U.S. Appl. No. 14/457,604, dated Jan. 12, 2017; 16 pages.
Notice of Allowance directed to U.S. Appl. No. 14/457,616, dated Jan. 28, 2016; 7 pages.
Notice of Allowance directed to U.S. Appl. No. 15/259,439, dated Mar. 23, 2017; 14 pages.
Examination Report directed to related Australian Patent Application No. 2017260202, dated Mar. 16, 2021; 7 pages.
Introduction to Inmate Correspondence System, White Paper, Advanced Technologies Group, Inc. (2002).

\* cited by examiner

ELECTRONIC MESSAGING EXCHANGE

CROSS-REFERENCE TO RELATED APPLICATIONS

This application is a Continuation Application of U.S. application Ser. No. 16/786,110, filed Feb. 10, 2020, which is a Continuation Application of U.S. application Ser. No. 16/175,202, filed Oct. 30, 2018, which is a Continuation Application of U.S. application Ser. No. 15/974,108, filed May 8, 2018, which is a Continuation Application of U.S. application Ser. No. 15/606,818, filed May 26, 2017, which is a Continuation Application of U.S. application Ser. No. 15/259,439, filed Sep. 8, 2016, which is a Continuation Application of U.S. application Ser. No. 14/457,593, filed Aug. 12, 2014, which is a Continuation Application of U.S. application Ser. No. 13/941,382, filed Jul. 12, 2013, which is a Continuation Application of U.S. application Ser. No. 12/802,641, filed Jun. 10, 2010, now U.S. Pat. No. 8,488,756, which is a Continuation Application of U.S. application Ser. No. 10/996,795, filed Nov. 24, 2004, now U.S. Pat. No. 7,742,581, the entire contents of which are herein incorporated by reference.

FIELD OF THE INVENTION

The invention relates generally to the field of electronic messaging exchange in correctional institutions or similar facilities. In particular, the invention discloses the use of an electronic message exchange system with the capacity to monitor, control access, and bill for usage of such a system.

BACKGROUND OF THE INVENTION

As electronic messaging has become commonplace with the advent of the Internet in recent years, many institutions, such as prisons, nursing homes, mental institutions, etc., have the need to offer inmates or residents controlled electronic messaging exchange access. Common forms of interaction for inmates and residents with external parties include such mediums as site visits and telephonic communication. While both of these methods can be useful, electronic messaging can prove to be more effective and provides an alternative to the aforementioned mediums. For the purposes of simplicity, discussion will be limited to inmates within a correctional facility, but the discussion can easily be expanded to include residents of other institutions.

Site visits from an inmate's family, attorney, etc. are often not economically or physically possible. The inability of visitors to make site visits to the inmate results from such factors as the distance from and costs incurred to travel to the institution. In addition, it is costly and difficult for some institutions to provide monitoring and security for the visitors and inmates. As a result, an alternative method is necessary to allow controlled inmate communication with external parties.

An alternative to site visits, telephonic communication, poses other problems. Some visitors may be several time zones away from the penal institution making telephonic communication difficult and even prohibitive. Additionally, telephonic communication between external parties and inmates can prove expensive. There are two common methods of payment available to inmates. In the first method, a collect call is placed to an acceptable outside party. In the second method, an inmate has an account in which money is deposited from a variety of sources and for each phone call; the cost of the call is then deducted from the account balance. The costs vary as a result of, inter alia, different service providers for different facilities. Usually the institutions contract a service provider to install, operate and maintain the facility's system. As a result, costs for calls within the penal institution are generally much more than for similar calls made outside of the institution.

From the standpoint of the institution, inmate telephone usage can prove expensive, as it is necessary to monitor and record the activities of each of the residents in order to properly charge each individual caller for his or her outgoing calls. There are three common methods for monitoring telephone calls: live monitoring, passive monitoring and monitoring via a standard recording device. One such system known in the art provides a computer-based telecommunication system for the purpose of allowing an institution to control, monitor, record and report usage and access to a telephone network. In addition, the institution controls whom the inmate can or cannot call.

Electronic messaging, such as emailing and instant messaging, has become prominent in recent years as a medium of information transfer. While there is good reason to provide inmates with electronic messaging access, there is also a necessity to control the inmate's access to sending and receiving electronic messages. There have been instances where email has been banned from prisons, even when received via a printed form, resulting from, inter alia, a lack of secure control methods. System control is necessary to prevent harassing messages to outside parties, to prevent fraudulent activities, etc. Therefore, systems in such environments must monitor and control the electronic messaging activity of each inmate. Systems should also have a means of maintaining electronic messaging records for each inmate. The system should include a means for communicating with emailed parties to enable the contacted parties to prevent future emails from inmates. The same holds true for instant messaging. In short, the communications system used in a regulated institution must employ unique monitoring and control functions often unnecessary in other types of electronic messaging exchange systems. Further, an exchange system in institutions should reduce the workload burden of the correctional facility while provide security through intelligence gathering capabilities.

In order for the methods of monitoring and control to be effective, it is important to prevent inmates from exploiting any loop-holes that can be used to bypass the control features of the system. This control is vital to ensure that the inmate does not access blocked addresses, for example, to perpetrate additional criminal activities or harass certain parties.

An electronic messaging system with restricted access should be able to perform the same functions as a normal electronic messaging system. The system should provide keyword scans, translation, file preparation, encryption, control over sent and received electronic messages to and from external sources, a billing method, etc. While there are systems that provide for some of these features, there is no system that provides a comprehensive solution for electronic messaging in a correctional facility. The present invention encompasses all the elements into a single system enabling a secure electronic messaging system to be utilized in penal institutions.

For example, systems are known in the art that filter unwanted, bulk, or junk emails, commonly referred to as "spam". The filtering can be done by a variety of methods including: sender address, sender organization, recipient address, recipient organization, attachment type, and email message content type. Each of these filtering types can be used in order to reduce "spam". The emails that pass the filtering process are then sent to a recipient or recipients. Potential "spam" is then stored in a separate location, where it is examined by either the potential recipient or a third party. If determined to be "spam", it is deleted or moved to another folder. Another possibility is to have the potential "spam" automatically deleted without verification by a party.

A different system provides a methodology for a computerized telecommunications system for voice to text message storage for use in correctional facilities. This system receives an external message via either voice or text. There are two storage means: a voice message box or an email inbox. If a voice message is received, it passes as a regular telephonic voice message is then stored as a voice message in the voice message box. If instead, the storage unit is an email box and a voice message is received, the voice message is converted to text and the message is then saved. The reverse happens if the message is a text message and the storage medium is a voice message box. If a text message is received and the inmate has an email in box, then the text message is saved as text. The inmate is then notified of the new message. This system can also allow the inmate to send either a text or a voice message to an external party. If it is a voice message, then no conversion occurs and the message is sent. However, if an inmate's message is in the form of text, then either a text to voice conversion occurs before being sent to the outside party or the text message is sent via email to the external party. The invention is limited in the fact that it can only handle email or voice messages.

Yet another system known in the art provides a system and method for providing a sponsored or universal telecommunications service and third party payer services. The system discloses a method for providing a service for a sponsor to pay for communication via voice, data or multi-media services, on the behalf of others. The method further provides universal service for telecommunication voice and multimedia applications without tax or market subsidies.

In the view of the foregoing, a need exists for an inclusive method for allowing inmates access to electronic messaging systems. The present invention provides an alternative to site visits, telephonic and other forms of communication. It also offers a secure method for using electronic messages within a correctional or similar institution, including such features as monitoring, controlling, archiving and billing.

SUMMARY OF THE INVENTION

The invention embodies an electronic message exchange system for use in penal institutions, or similar facilities and institutions. It provides a combination of systems and services, which allow inmates and their outside contacts to communicate via written correspondence in an expedient manner. Further, the present invention includes the capability for sending and receiving messages via a telephone and converting them as the necessary to text or similar format. The present invention also reduces the workload of the correctional facility staff and offers increased security by providing intelligence gathering capabilities.

The invention is designed to provide routing and identification processing, content control, translation, file preparation, and encryption. Also, a method for billing of services rendered is included, in addition to controlling the communication limitations for the inmate through such methods as populating an allowed or disallowed contact list, and controlling the frequency, size and length of communications. It also features alert methods for sent and received messages.

The invention provides a secure barrier, referred to herein as the central service center or central station, through which messages are forwarded to the intended party. The central service center is designed to gather information from the messages and alert the appropriate officials of those messages that present concerns prior to being disseminated to the receiving party.

In addition, the central service center acts as the central processing center for incoming and outgoing messages. Its primary objective is to provide a centralized location capable of processing messages to and from approved accounts. In the preferred embodiment of the present invention, files are created as a result of the required processes of the institution and saved in an approved format (i.e., email, printed medium, voice message, or other similar types of formats). These files are then retrieved from or sent to the institution depending on the requirements. The service center also serves as a repository of all messages and of all primary data captured from those messages. Further, it serves as a web portal through which institutions and users can retrieve messages and data from those messages.

Additionally, the central service center is preferably located remotely from the institution. However, it is foreseeable that the central service center may be located at the institution. Outside contacts gain access to the central service center preferably via their existing Internet Service Provider (ISP). The service center provides secure web-based access via a user-friendly interface to each outside contact through the system's software, preferably residing on a server at the service center. In the preferred embodiment, once an account is created and payment means are established, the outside contact may log in to the central service center. After the outside contact logs in, he or she may view a received message and/or compose a message to his or her intended recipient, such as to an inmate. In the preferred embodiment, the outside contact's account is charged a monthly fee for the service. In an alternative embodiment, the outside contact's account is charged by an amount commensurate with the charges for each message. The payment method may be pre-paid or the account can be charged for later billing. These methods will vary and are customizable based on the institution's requirements.

Furthermore, the central service center processes messages using various criteria, including, but not limited to, the intended recipient, keyword searches, language translation, suspect criteria, etc. Once these processes have been performed, files containing the appropriate information (i.e., a message to an inmate including necessary identification information about the sender and the recipient) are forwarded to a site server or multifunction device designated for the system, preferably located at the institution. The institution's staff has an opportunity to view the messages according to their desired priorities prior to allowing the messages to be delivered to their intended party. Additionally, the central service center also provides intelligence gathering and reporting capabilities, which are made available through various screens in the system software. Administrators can access the system locally or remotely via the Internet. Certain aspects of the central service center may alternatively be incorporated into a site server, if supplied.

The invention also provides several methods of inputting text, including, but not limited to, a computer terminal, fax and written correspondence. In addition, an inmate may leave a voice message, which is then preferably converted to text. Safe terminals may be provided for the inmate population, which allow inmates to type outgoing messages and view incoming messages. In this embodiment, the safe terminals are preferably completely isolated from the Internet, connected only to the site server, and only capable of accessing the secure system software. If an inmate handwrites a message, the message is scanned and sent to the appropriate contact. Further, messages received from outside contacts may be printed onsite and once the message is approved for viewing, the printed message is sent to the inmate.

In an alternative embodiment, an integrated system is used for both instant messaging and email, which allows inmates direct access to terminals for sending and receiving messages. In yet another different embodiment, two separate systems exist, one for instant messaging and one for email purposes. These embodiments also have a secure site (similar to the preferred embodiment) that both inmates and external parties log into in order to communicate with each other. Further, administrators can remotely access and manage the site.

When safe terminals are incorporated into the system, the system preferably utilizes a secure user name and password for user authentication. In this embodiment, the institution pre-determines the user name and password, with the password preferably changing after a fixed interval of time or if tampering is suspected. However, to one of ordinary skill in the art, it is apparent that other forms of security measures can easily be implemented including such methods as radio frequency identification (RFID), and various biometric features. These methods can be used alone or in conjunction with any of the other security measures.

In the preferred embodiment, each inmate has a unique recipient address or user identification that external parties can send a message to. When an outside party attempts to send an electronic message to an inmate, a series of control measures occur. The sender address is checked for authenticity and to ensure that the sender is an acceptable contact for the inmate. The acceptable contact list can be maintained via an "allowed contact list" or via a "disallowed contact list". The allowed and disallowed lists may also be used in conjunction with each other. Content control is managed as the message itself is scanned for certain keywords and phrases. If a keyword or phrase is found, the message is flagged and sent to the service center or institution for manual examination. The message is translated as necessary, and the files are prepared and encrypted. After passing through the control measures, the message is then routed to the appropriate institution for viewing on the secure terminal or printing on the multifunction device. To one knowledgeable in the art, other authentications and control measures can be easily implemented. For outgoing inmate messages, a series of authentications is also performed similar to that of incoming messages.

The invention alerts the inmate of received messages preferably via the same method used by the institution for received mail. Also, the actual message may be delivered with the mail via a printed medium. In an alternative embodiment, the inmate is alerted after he or she successfully logs into a secure terminal, such as the aforementioned safe terminal. In yet a different embodiment, the inmate is notified on closed circuit monitors that display a list of the inmates that have new messages.

The preferred embodiment of the invention allows external users access to set up an account. It provides security checks for authorizing the external user. After the account is set up by the external party, the account holder can communicate via written messages with the desired inmate. The invention further preferably provides a maximum limit to the amount of communication between the parties. In the preferred embodiment, the external party's account is billed a monthly service fee.

In an alternative embodiment, each inmate has a registered account (as opposed to the account being registered to the external party). When the account is accessed and email is sent, the cost of the email is then deducted from the account balance. Payment occurs from such methods as pre-paying or billing after-the-fact for usage. A similar method can be implemented for instant messaging. Charges can be accrued based on measures such as total number of words, total number of lines, a fixed rate for each message sent or a rate for the time the inmate is logged in, etc.

The invention archives all incoming and outgoing messages through an automated storage database. This database can be searched in a variety of ways to retrieve desired information, except for restricted or privileged communications that are protected by the attorney-client privilege. These electronic messages are locked except to the authorized parties.

In the current embodiment of the invention, when an inmate sends a message to an approved address, the recipient receives an email notification from an automated administrator stating that the inmate wishes to send the recipient a message. If the recipient desires to receive the message, he or she then logs onto a secure site via the Internet, enters the appropriate security identification and views the message. The recipient is required to set up an account for the purposes of monitoring the messages sent and received. Also, the account is preferably billed based on a monthly service fee. All forms of forwarding or copying the message to anyone other than the original recipient are prevented. The external recipient then has the option of sending an email back to the inmate. Recipients can also choose to remove the inmate from their list, preventing the inmate from future contact with said recipient.

When instant messaging is allowed by the institution, an inmate who wishes to have an instant message conversation with an approved external party sends a message to the external party through the secure site and if the party accepts, the outside party then logs onto the secure site where the instant messaging conversation then occurs. If the external party does not respond, the inmate has the option of sending a message to attempt to set up a date and time to hold the conversation. The message sent from the inmate to the outside party can be sent to an email address or an outside instant messaging platform.

Therefore, it is an object of the invention to provide a comprehensive electronic message exchange system for use in penal or similar institutions.

It is also an object of the invention to provide secure written correspondence to and from an inmate in a secure facility.

A different object of the invention is to provide means for leaving a voice message and converting the voice message to text for viewing.

It is another object of the invention to provide a secure platform from which electronic messaging can occur.

It is yet another object of the invention to provide security authentication for inmates and external parties.

It is still another object of the invention to provide translation for incoming or outgoing messages.

It is also an object of the invention to control the list with whom an inmate can electronically converse.

Additionally, it is an object of the invention to prevent messages from being forwarded to any additional parties by the recipient of the message.

It is a further object of the invention to encrypt the incoming and outgoing messages within the electronic message exchange system.

Furthermore, it is an object of the invention to provide content control for messages via such methods as keyword and phrase scanning.

It is still another object of the invention to provide alerts for the inmate upon receiving a message from an external party.

It is a further object of the invention to provide a billing method for services rendered while using the electronic message system.

It is another object of the invention to reduce institutional staff resources required for correspondence purposes.

Further, it is an object of the invention to provide the appropriate, personnel with means to search for and view incoming and outgoing messages.

Finally, it is an object of the invention to archive and store all messages in a database and to mark all protected messages for such reasons as attorney-client privilege, thus making them inaccessible except to those with the authority to access them.

Other objects, features, and characteristics of the invention, as well as methods of operation and functions of the related elements of the structure, and the combination of parts and economies of manufacture, will become more apparent upon consideration of the following detailed description with reference to the accompanying drawings, all of which form part of this specification.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE DRAWINGS

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention (in addition to some alternative embodiments).

Figure 1:
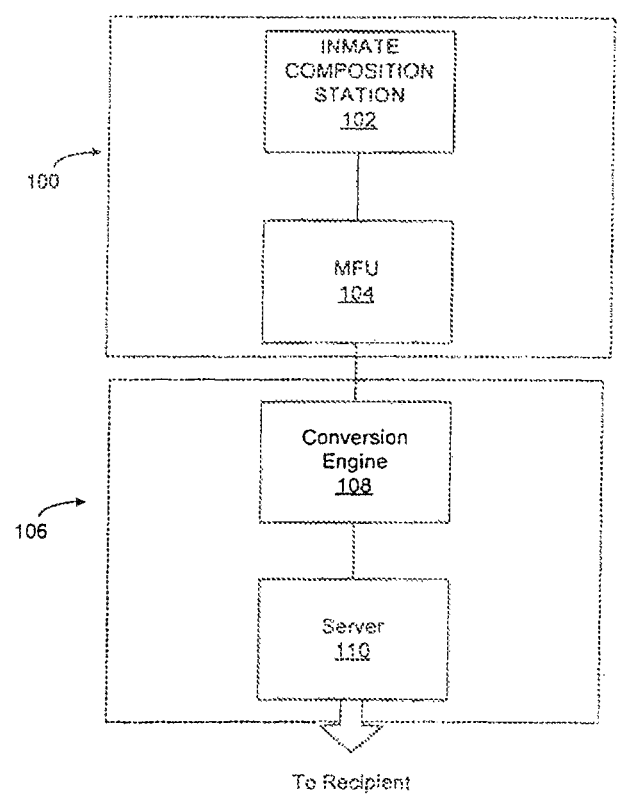
FIG. 1 is a block diagram of the preferred embodiment of the invention depicting the electronic message exchange system.

Starting first with FIG. 1, depicted is a block diagram of the preferred embodiment of the invention illustrating the structural set up of the electronic message exchange system. When an inmate desires to send a message to an external party, the inmate goes to inmate composition station 102 located at institution site 100. In the preferred embodiment, an inmate composes a hand-written or typed text message on a preprinted form. On this form, the inmate fills out his or her personal registration number and the account number, which the inmate wishes the message to be sent to. The account number is associated with an outside contact that has set up an account for access to the system. In an alternative embodiment, an inmate may leave a voice message, which is then converted to text. One of skill in the art will recognize that this conversion can easily be incorporated into the system. Also, the inmate may alternatively have access to a workstation for sending and receiving messages. The system preferably charges the outside contact a monthly fee for the ability to use the system, although other billing methods are foreseeable. The number of messages sent and received by the external party is configurable to meet the security and workload needs of each individual institution. For example, in the present embodiment each external party may send "n" messages and receive "n" messages from each inmate on their list where "n" is an integer. For instance, if an outside contact desires communication with two inmates, then the outside contact is allowed to send "n" messages to each inmate and receive "n" messages from each inmate, for a total of "4n" messages, "2n" for each inmate.

After the inmate composes the message at inmate composition station 102 located at institution site 100, the message is sent to multi-function unit (MFU) 104. Preferably, MFU 104 is located in the institution's mailroom, but other locations are foreseeable. The inmate messages are loaded into MFU 104. MFU 104 scans the messages and the messages are electronically sent to central station 106. Central station 106 is preferably located remote to the institution and is preferably connected to MFU 104 via an Internet Protocol (IP) connection. At central station 106, conversion engine 108 converts the written or typed text messages received from MFU 104 into digital data that can be processed by server 110. Although only one server 110 is pictured, multiple servers may be used commensurate with the amount of data requirements: Central station 106 further includes such elements as routers and data services via local telephone company provided circuits (not shown in FIG. 1).

The aforementioned conversion can be done by such means, including, but not limited to, optical character recognition (OCR) and intelligent character recognition (ICR). Once conversion engine 108 converts the message as necessary, server 110 at central station 106 associates each message with the intended recipient and the message sender. Server 110 checks to see if the attempted message exchange is acceptable. Server 110 also checks to ensure that the intended recipient and the inmate are authorized to communicate. It further provides keyword and phrase scans of the messages. In the preferred embodiment, the site staff are allowed to view messages and approve the before sending the message to the recipient. Additionally, the system notifies the intended recipient of the message that the inmate has sent a message and provides for secure access and user log in for the recipient to view the message from the inmate and compose messages to the inmate.

The system preferably provides secure socket layer (SSL) protection of data sent to and received from server 110. The typed or written text messages are stored as an image or converted to another format as required and made available for viewing by the intended recipient on server 110. Server 110 provides a user-friendly interface for viewing and composing messages preferably via the Internet. It enables users to set up accounts and provides for billing for system usage. Server 110 also is capable of providing such features including, but not limited to, language translation, file encryption, filtering, file storage and file preparation. Finally, messages received by the external party or the inmate are blocked from being forwarded, copied, etc.

Figure 2:
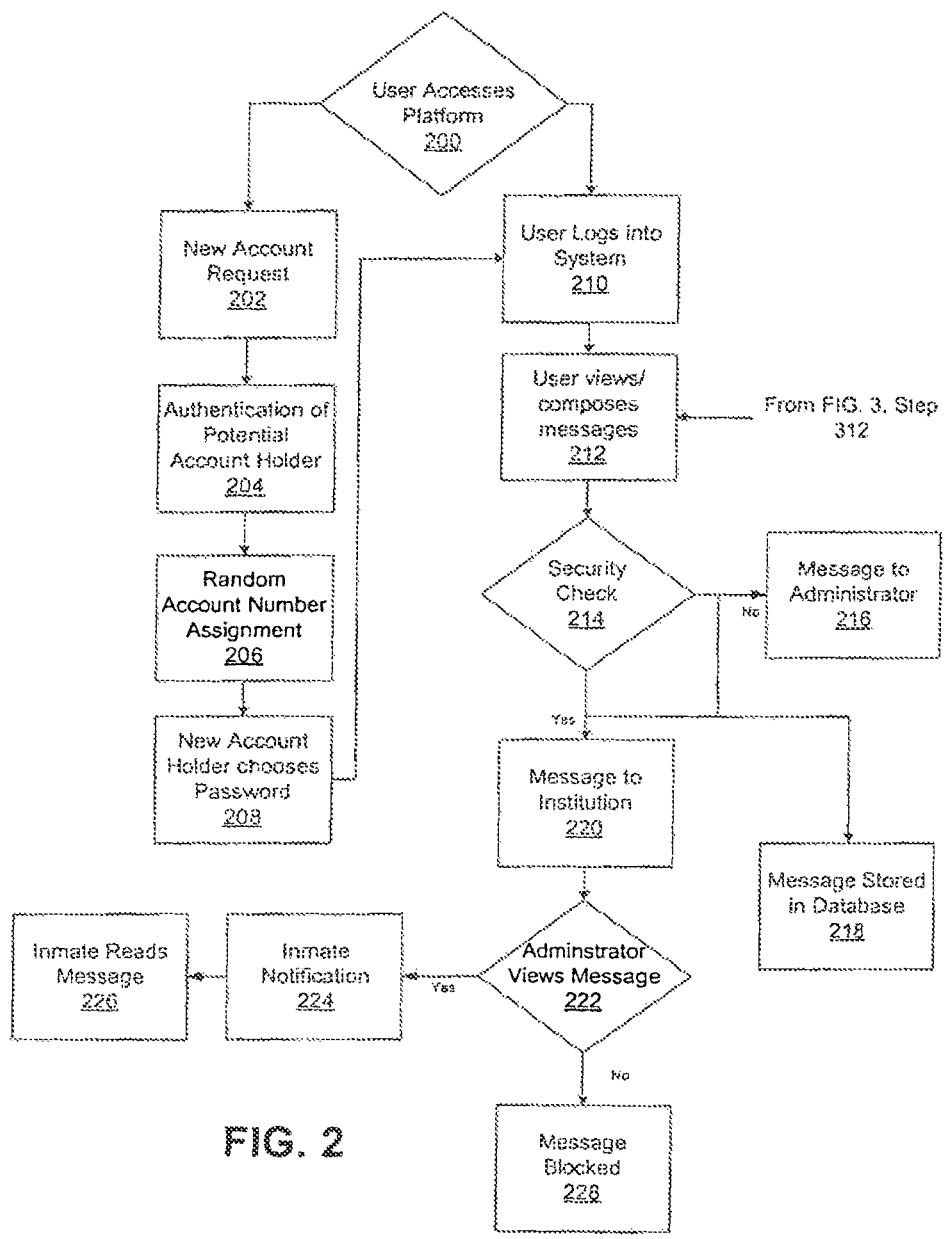
FIG. 2 is a flow chart of the preferred process of the invention illustrating an external party sending messages to an inmate and viewing messages sent by an inmate.

Next, FIG. 2 depicts a flow chart of the preferred process of the invention illustrating both an external party sending messages to an inmate and viewing messages sent by an inmate. Initially, an external party attempts to access the secure system preferably via an Internet browser (step 200). The system provides a user-friendly interface for message viewing and composition. If the user has not yet set up an account, the user enters a new account request (step 202). The system then performs an authentication check of the potential account holder to ensure, inter alia, whether the user is an acceptable contact for the inmate (step 204). If the user passes the authentication step, the user is assigned a random account number (step 206).

The user is then prompted to choose a password (step 208). Other authentication means are foreseeable as well, such as a personal identification number (PIN) or biometric identification means. Using the account number and password, the user logs into the system (step 210). If the user already has an account when he or she initially attempts to log into the system (step 200), the user proceeds directly to the log in step (step 210). After successful log in, the user views messages received from the inmate or composes messages to be sent to the inmate (step 212). The system then provides security checks (step 214) whereby the message is checked for such things as keywords, and content. If the message passes the security checks, it is then sent to the institution (step 220). If, however, the message fails the security checks, it is sent to an administrator (step 216). At this point, the message and all other relevant file data are stored in a database (step 218). The system preferably bills the appropriate account a monthly service fee. In alternative embodiments, other billing methods, such as billing for the number of messages sent or for message length, may be utilized. The preceding processes are preferably performed by server 110 located at central station 106. However, it is foreseeable that other servers or devices can be utilized to perform these functions. The message is sent to MFU 104 where the message is converted to a viewing format as required by the institution (step 220). The administrator preferably views the message and decides whether to allow the sending of the message (step 222). If the message passes the administrator check, the inmate is notified (step 224) and the inmate reads the message (step 226). If the message fails the administrator's check, it is blocked from the inmate (step 228).

Figure 3:
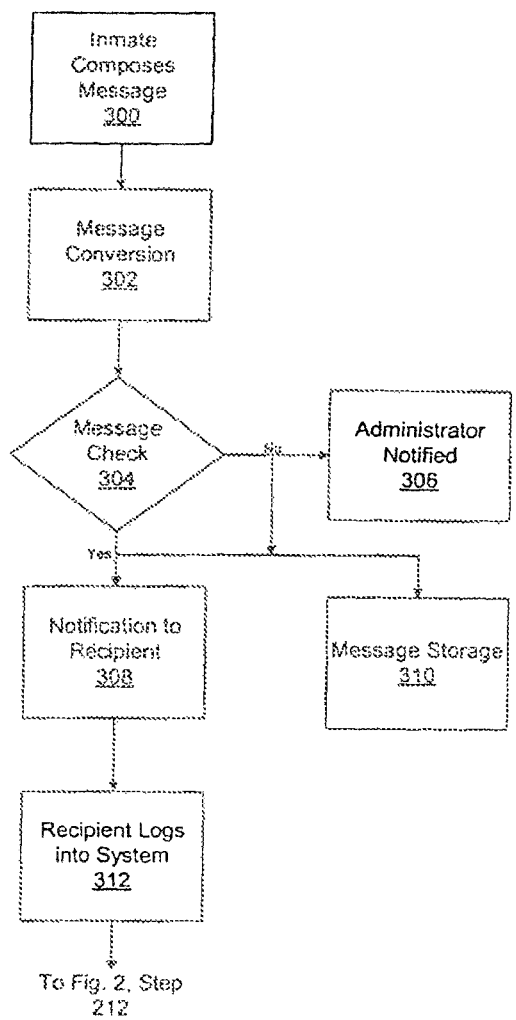
FIG. 3 depicts a flow chart of the preferred process of the invention whereby an inmate sends a message to an external party.

FIG. 3 depicts a flow chart of the preferred process of the invention whereby an inmate sends a message to an external party. First, the inmate composes a message at inmate composition station 102 located at institution site 100 (step 300). As previously discussed, this message is preferably either hand written or typed and contains the necessary information regarding the inmate and the potential recipient. However, it is foreseeable that the inmate may leave a voice message or similar which is then converted as necessary. In addition, the inmate may have direct access to a safe terminal or workstation for message composition. After the inmate completes the message, the message is sent to MFU 104. The message is scanned by MFU 104 and sent to conversion engine 108 located at central station 106 (step 302). The message is converted to a format appropriate for transmission to the recipient by conversion engine 108. Conversion engine 108 converts the message using such means as OCR or ICR. Next, security checks are performed on the message (step 304), which include, inter alia, making sure the recipient is an acceptable contact, keyword and phrase scan, and file preparation. If the message fails to pass the security checks (step 304), an administrator is notified (step 306), and the message is stored in a database (step 310). Further, the system preferably charges the appropriate account a service fee monthly.

If the message instead passes the security check (step 304), the system sends a notification to the recipient stating that a new message from the inmate is available for viewing over the secure system site (step 308) and the message is stored (step 310). The recipient logs into the secure site preferably via an Internet browser (step 312) and views the message (step 212). The recipient also has the option of sending a message to the inmate at this point. If the recipient chooses to do so, the recipient then proceeds to compose a message (step 212).

Figure 4A:
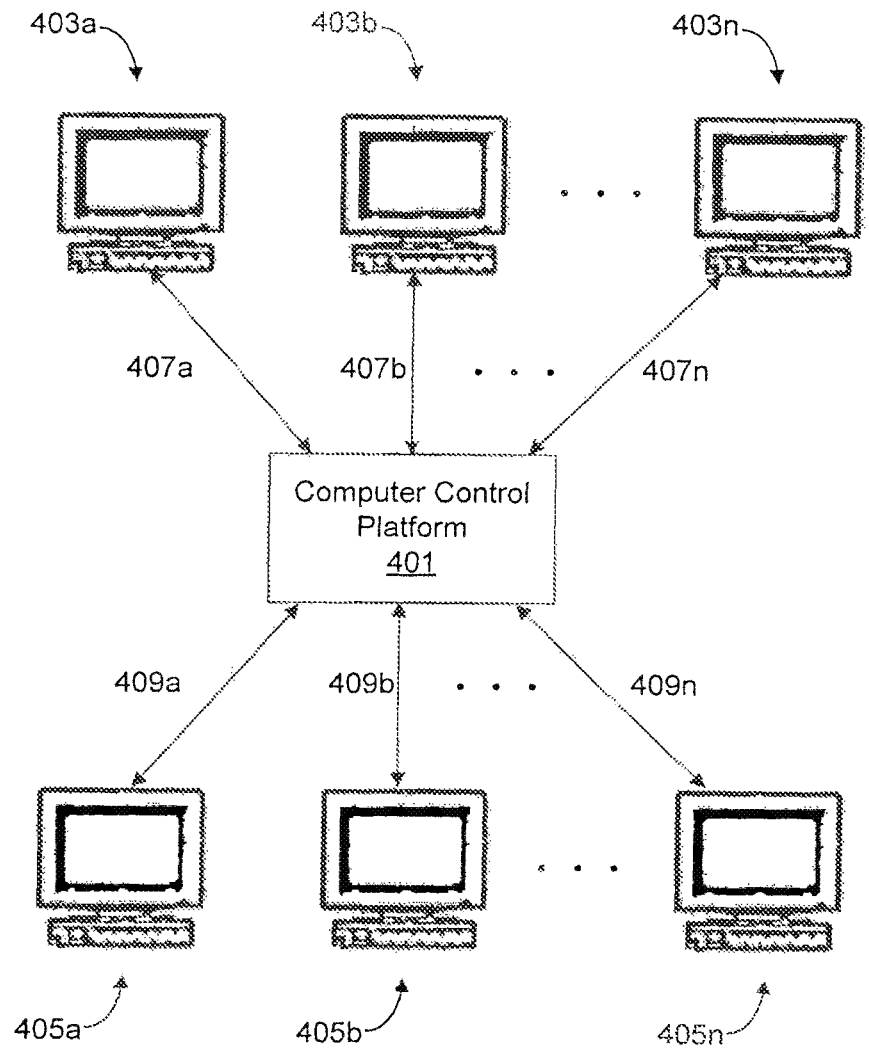
FIG. 4A depicts a block diagram of an alternative embodiment for the electronic messaging exchange system allowing inmates direct access to user workstations.

FIG. 4A shows a block diagram of the basic set up of the electronic message exchange system according to an alternative embodiment of the invention. Computer control platform 401 is connected to the user workstations 403a-n and the external third parties 405a-n via connections 407a-n and 409a-n, respectively. Computer control platform 401 can be local or remote to the user workstations. Connections 407a-n can be either cable or wireless. In addition, connections 407a-n can be a Wide Area Network (WAN), a Local Area Network (LAN) connection, etc. Connections 409a-n connects the computer control platform 401 to the external third parties 405a-n via the Internet.

Computer control platform 401 is monitored and controlled, either actively or passively, by an administrator. Computer control platform 401 contains one or more servers, which processes the electronic messages, prepares and routes the electronic messages, performs security checks and encrypts the electronic messages. It also stores the electronic messages. In addition, computer control platform 401 prepares notifications to send to either the inmate or the external third party. It also has a secure platform for communication between the inmate and third party. Both the inmate and third party use this platform to send messages back and forth. Further, administrators can remotely or locally access the system via a workstation (not shown). In the remote access set up, the administrator accesses the system via the Internet to perform various administrative functions (i.e., viewing messages, setting control parameters, performing database searches, printing reports, etc.).

Figure 4B:
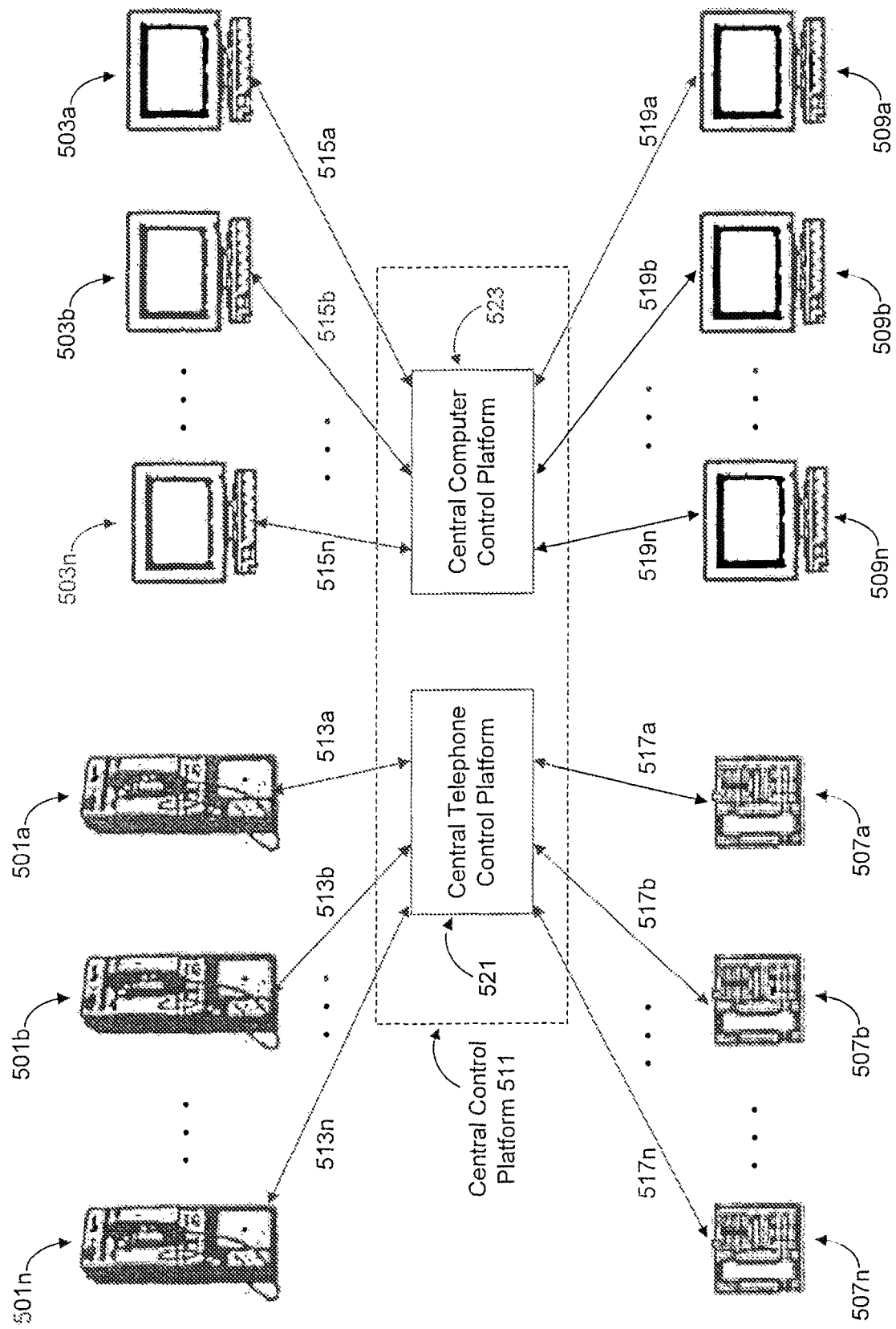
FIG. 4B depicts a block diagram of an alternative embodiment illustrating a universal control system for incorporation of a telephonic communications system in conjunction with the electronic messaging exchange system.

FIG. 4B depicts a block diagram of another alternative embodiment of the invention. In addition to enabling electronic messaging, this alternative embodiment provides a telephonic communication platform as is known in the art. Also, the system enables users to send and receive voice messages. Further, the system converts the messages from voice to a variety of text formats and from a variety of text formats to voice as necessary. Central control platform 511 contains central computer control platform 523 and central telephone control platform 521. Central computer control platform 523 performs the same functions as the aforementioned computer control platform 401. Central computer control platform 523 is connected to user workstations 503*a-n* and third party workstations 509*a-n* via connections 515*a-n* and connections 519*a-n*, respectively. Connections 515*a-n* may be cabling or wireless. Also, connections 515*a-n* can be a WAN connection, a LAN connection, etc. Connections 515*a-n* connect computer control platform 523 to the external third parties 509*a-n* via the Internet.

Computer control platform 523 is monitored and controlled, either actively or passively, by an administrator. The administrator may perform various administrative functions via a local workstation (not shown) or remotely by accessing the system via the Internet. Computer control platform 523 contains one or more servers, which processes the electronic messages, prepares and routes the electronic messages, performs security checks and encrypts the electronic messages. It also stores the electronic messages. In addition, computer control platform 523 prepares notifications to send to either the inmate or the external third party. It also has a secure platform for communication between the inmate and third party. Both the inmate and third party use this platform to send messages back and forth.

Central control platform 511 also contains central telephone control platform 521. Central telephone control platform 521 connects user telephonic communication devices 501*a-n* with external party telephonic communication devices 507*a-n* via connections 513*a-n* and 517*a-n*, respectively. Central telephone control platform 521 enables inmates to telephonically communicate with an external third party. Central telephone control platform 521 provides for control, monitoring, and billing. Further, central control platform 511 enables conversion between voice and text messages. For example, if the system receives a voice message, the system can convert the voice message to a text format for viewing.

Figure 5:
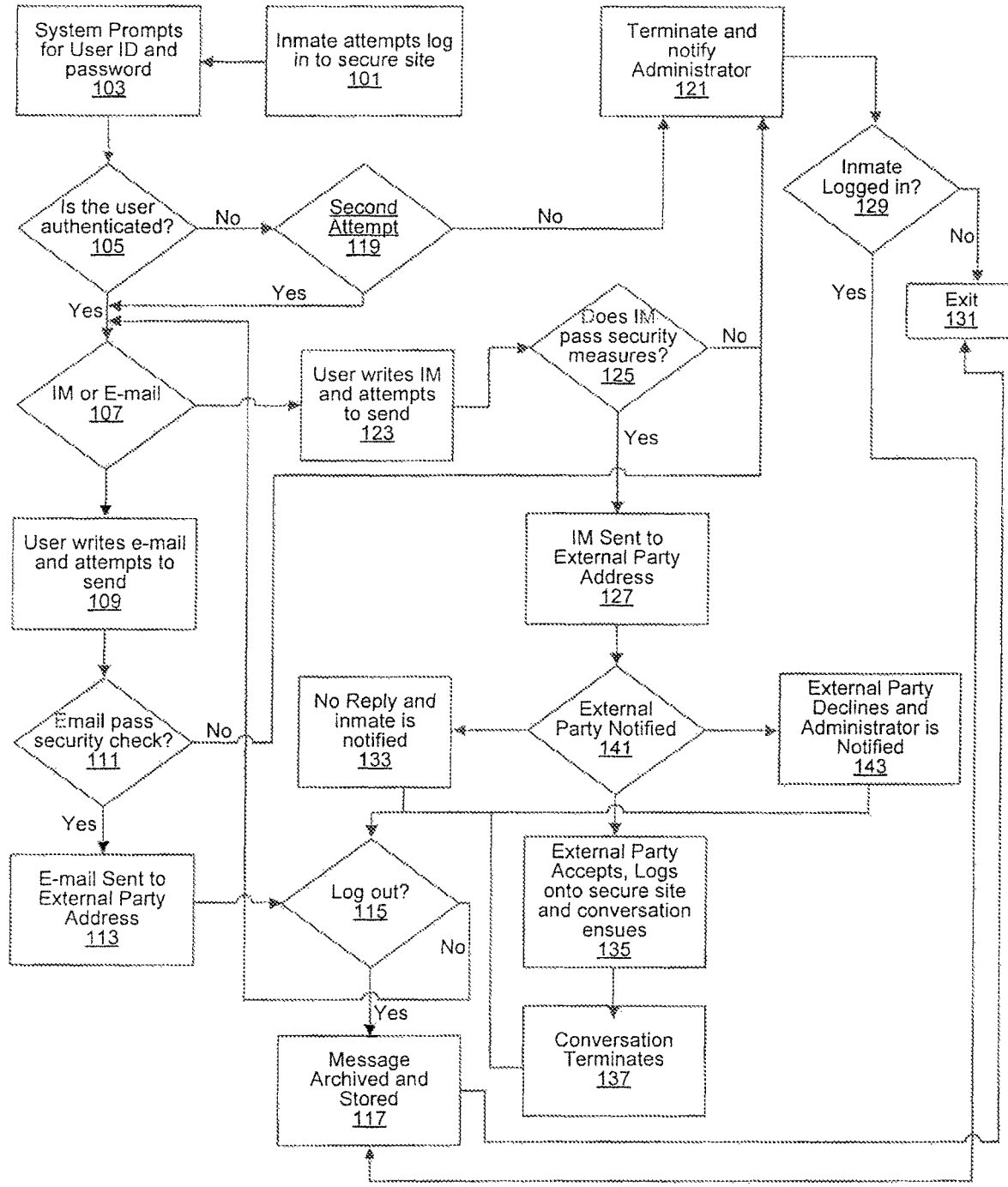
FIG. 5 is a flow chart of an alternative process of electronic message exchange between an inmate and an external party according to the present invention when inmates are provided direct access to user workstations.

FIG. 5 depicts a flow chart of an alternative process showing the electronic messaging exchange between the inmate and the external party. As shown, the process begins with an inmate's attempt to log into the secure platform (step 101). The site then prompts for the inmate to enter a provided user name and password (step 103), although to one skilled in the art, other security measures such as biometrics, radio frequency identification (RFID), etc. can be used "instead of or in conjunction with a user name and password. Next, the user authentication is checked (step 105). If the user is authenticated, the process continues where the inmate is asked to choose whether he or she would like to instant message (IM) or email an external party (step 107). If the user is not authenticated, the user is again prompted to enter the user name and password (step 119). If the user is authenticated on this second attempt, then the user is asked whether he wants to send an IM or email (step 107).

If, however, the inmate again incorrectly inputs the proper identification, the session terminates and an administrator may be electronically notified (step 121). When this second attempt failure occurs, the session is checked to see if the user ever logged in (step 129). If the user was not logged in, then the system is exited (step 131). Preferably, a monthly service fee is charged to the appropriate account. However, fees can be also be charged based on a variety of different methods, including, but not limited to, a charge per email or IM, a per minute charge, or a charge for the length of messages sent or received. Also, the system may be set up such that a third party can pay for the email or IM communication. Once messages have been archived (step 117), the system exits (step 131).

The system can be configured to allow only one log on attempt. Also, the system may be configured to allow for more than one attempt. Both of these can be controlled at the administrator's option. Additionally, the system may be triggered to automatically monitor or record communication after a certain number of attempts rather than terminate the session. Further, the system can be set to monitor or record any session that the administrator desires, such as for certain users that have previously attempted to engage in criminal activity via the system.

The inmate decides whether to email or IM and the inmate writes either an email (step 109) or an IM (step 123). If the inmate chooses to compose an email, after the inmate writes the email, it is subjected to security measures including a content check and authentication that the potential recipient has an acceptable address (step 111). If the email passes through security, an email notification is sent to the recipient containing a log in identification, password and directions to a secure site that he or she can visit to view the sent message (step 113). The inmate is then prompted to log out (step 115). If the inmate chooses instead to continue, the process reverts back. The inmate is prompted to choose whether to IM or email (step 107). If the inmate logs out, the messages are archived (step 117). If the email fails to pass the security check (step 111), the session is terminated and the administrator is notified (step 121). In addition, at this point, a check of whether the user was logged in and if messages were sent occurs (step 129) and if verified, and messages are archived (step 117). If the message is confidential as protected by attorney-client privilege, it is locked so that it cannot be accessed by unauthorized sources.

If the inmate chooses to write an IM instead of an email (step 107), the inmate writes an IM and attempts to send it (step 123). The instant message is subjected to the same security measures as an email (step 125). If the message fails to pass, the session is terminated and the administrator is notified (step 121). Next, the system checks to see if the user was logged in and if any messages were sent (step 129). If yes, the messages are archived and stored (step 117) and the system exits (step 131). When an IM passes the security constraints (step 125), a message is sent to the external recipient (step 127).

After the message is sent (step 127), the contacted external party is notified of the attempted contact by the inmate (step 141). For example, the external party can be notified of the attempted contact by the inmate, through an email, or via a third-party instant messaging platform. The response can result in three different scenarios. The first is that there is no reply from the external party after a set interval of time (step 133). When this occurs, the user is prompted to log out or continue and attempt another electronic message exchange (step 115). Additionally, the user has the option of sending another message to the external party to set up a time and date when he or she wishes to hold a future IM conversation. If the user logs out, messages are archived and stored as previously discussed (step 117). If instead the inmate decides to attempt another message, the user is prompted to choose if he or she wants to write an email or IM (step 107).

The second possibility when the external party is notified is that the external party declines the conversation and the administrator is notified (step 143). The user is prompted to log out or continue (step 115) and the process continues.

The final possibility is that the external party accepts the invitation to join the inmate in an instant messaging conversation (step 135). Further, the external party logs into the secure site and a conversation ensues. The conversation is monitored via such methods as word spotting. If inappropriate conversation ensues, the conversation is terminated immediately (step 137). If not, the conversation continues for a set length of time, after which the system terminates the conversation. The user is then prompted to log out (step 115) and the loop repeats.

The system can be also be configured to automatically log out after a user has been logged in for a set time period. In this embodiment, the system is also set to notify the user at given intervals to warn the user of the remaining time before automatic log out occurs.

Figure 6:
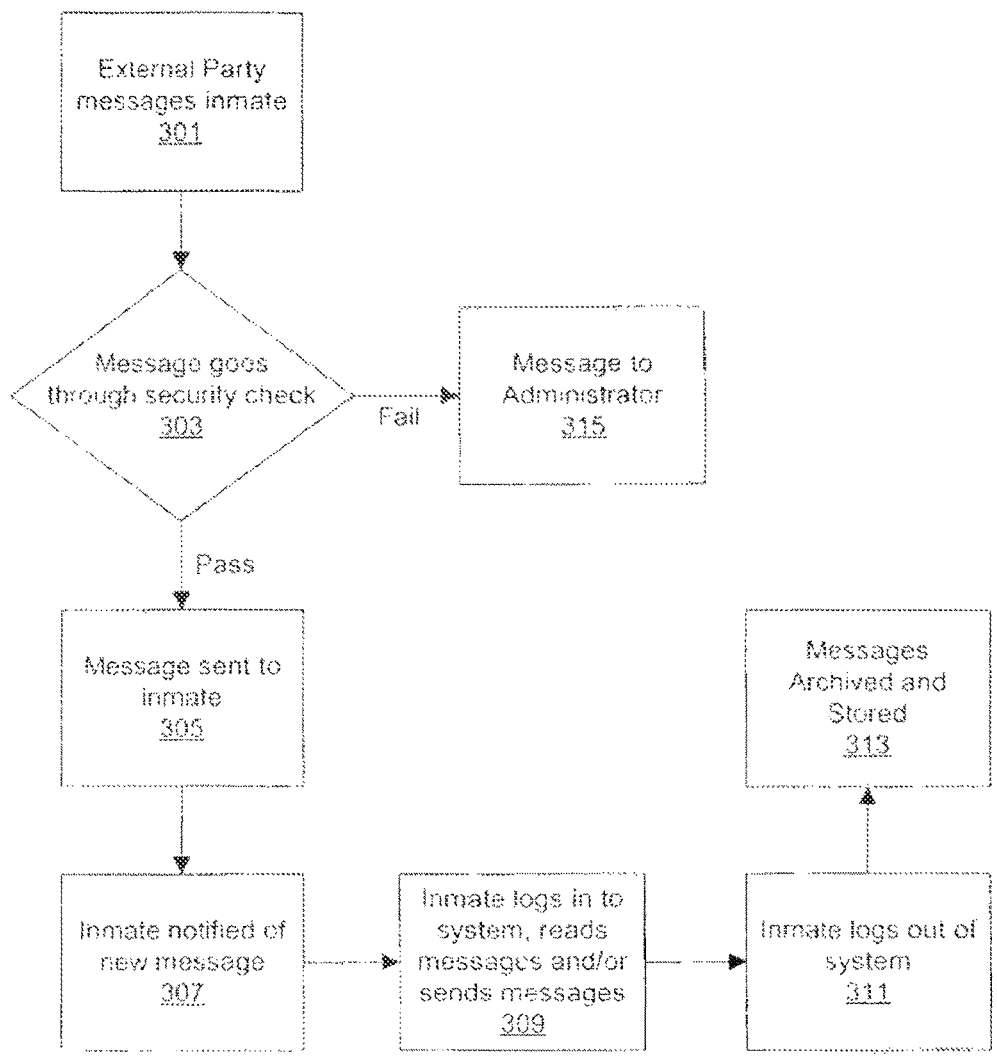
FIG. 6 shows a flow chart of an alternative process for electronic message exchange from an external party to an inmate according to the invention when inmates are provided direct access to user workstations.

FIG. 6 depicts an alternative process whereby an external party messages an inmate (step 301). The message goes through a security check (step 303). The security check may include both manual and automated security checks. The external party is verified as an acceptable contact for the inmate and the sender address is authenticated through such methods as a digital signature. If the message fails the security check, the administrator receives the message (step 315). Conversely, if the message passes the security checks, the system sends the message to the inmate (step 305). Next, the inmate is notified of the new message (step 307). The inmate then logs into the system and reads or sends messages (step 309), preferably following the same process as in FIG. 2. After completing the session, the inmate logs out (step 311). The messages are archived and stored (step 313).

While the invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A method for secure electronic message exchange, comprising:
   authenticating, by a wireless terminal, an inmate of an institution when the inmate attempts to login to the wireless terminal, wherein the wireless terminal is isolated from an internet;
   generating, by the wireless terminal, an electronic message for a user based on input from the inmate, the user being external to the institution;
   transmitting, by the wireless terminal, the electronic message to a control platform using a wireless connection, wherein the control platform is located outside the institution, and the wireless terminal is coupled to the control platform;
   receiving, by the control platform, the electronic message from the wireless terminal;
   performing, by the control platform, an automated security scan of the electronic message;
   authenticating, by the control platform, the user by determining whether the user is an approved contact for the inmate;
   based on the automated security scan and the authentication of the user, forwarding, by the control platform, the electronic message to a secure platform, and forwarding a notification associated with the electronic message to a device associated with the user;
   receiving, by the secure platform, a login request from the device associated with the user in response to receiving the notification associated with the electronic message;
   approving the login request from the user;
   providing, by the secure platform, secure web-based access to the user upon approval of the login request; and
   facilitating, by the secure platform, a subsequent electronic message conversation between the inmate and the user using the secure web-based access, wherein the secure platform is integrated within the control platform.

2. The method of claim 1, further comprising:
   transmitting, by the control platform, a further notification to an administrator; and
   storing the electronic message in a database.

3. The method of claim 1, wherein the wireless terminal is connected exclusively with the control platform.

4. The method of claim 1, wherein the approving the login request from the user includes using at least an account and password information.

5. The method of claim 1, wherein the performing, by the control platform, the automated security scan of the electronic message includes searching for one or more key words.

6. The method of claim 1, further comprising:
   verifying payment for messages in the subsequent electronic message conversation, the payment being based on a length of each of the messages in the subsequent electronic message conversation.

7. A method for secure electronic message exchange, comprising:
   receiving, by a secure platform, a login request from a remote device associated with a user, wherein the remote device is located outside a secure inmate facility;
   approving the login request from the user;
   providing, by the secure platform, secure web-based access to the user;
   receiving, by the secure platform, an electronic message from the remote device;
   transmitting, by the secure platform, the electronic message to a control platform, wherein the secure platform is coupled to the control platform, and the control platform is located outside the secure inmate facility;
   authenticating, by the control platform, the user by determining whether the user is an approved contact for an inmate;
   performing, by the control platform, an automated security scan of the electronic message;
   based on the automated security scan, transmitting, by the control platform, the electronic message to a wireless terminal using a wireless connection or to an administrator, wherein the wireless terminal is coupled to the control platform, and forwarding a notification associated with the electronic message to alert the inmate of the electronic message;

receiving, by the wireless terminal, the electronic message from the control platform;

authenticating, by the wireless terminal, the inmate when the inmate attempts to login to the wireless terminal;

providing, by the wireless terminal, the electronic message to the authenticated inmate; and facilitating, by the secure platform, a subsequent electronic message conversation between the authenticated inmate and the user using the secure web-based access, wherein the secure platform is integrated within the control platform.

8. The method of claim 7, further comprising:
transmitting, by the control platform, a notification to the administrator; and storing the electronic message in a database.

9. The method of claim 7, wherein the wireless terminal is connected exclusively with the control platform.

10. The method of claim 7, wherein the approving the login request from the user includes using at least an account and password information.

11. The method of claim 7, wherein the performing, by the control platform, the automated security scan of the electronic message includes searching for one or more key words.

12. The method of claim 7, further comprising:
verifying payment for messages in the subsequent electronic message conversation, the payment being based on a length of each of the messages in the subsequent electronic message conversation.

13. A secure electronic message exchange system, comprising:
a control platform located outside a prison facility;
a secure platform integrated within the control platform; and
a wireless terminal coupled to the control platform, the wireless terminal being isolated from an internet, the wireless terminal configured to:
authenticate an inmate of the prison facility when the inmate attempts to login to the wireless terminal,
generate an electronic message for a user based on input from the inmate, the user being external to the prison facility, and
transmit the electronic message using a wireless connection to the control platform,
wherein the control platform is configured to:
receive the electronic message from the wireless terminal,
perform an automated security scan of the electronic message,
authenticate the user by determining whether the user is an approved contact for the inmate, and
based on the automated security scan and the authentication of the user, forward the electronic message to the secure platform, and forward a notification associated with the electronic message to a device associated with the user, and
wherein the secure platform is configured to:
receive a login request from the device associated with the user in response to receiving the notification associated with the electronic message,
facilitate approval of the login request from the user,
provide secure web-based access to the user upon approval of the login request, and
facilitate a subsequent electronic message conversation between the inmate and the user using the secure web-based access.

14. The system of claim 13, wherein the wireless terminal is further configured to authenticate the inmate using at least one of a login and password information, a biometric information, and a radio frequency identification.

15. The system of claim 13, wherein the secure platform is further configured to approve the login request from the user using at least an account and password information.

16. The system of claim 13, wherein the control platform is further configured to determine whether the electronic message is protected by a legal privilege, and to restrict access to the electronic message if the electronic message is determined to be protected by the legal privilege.

17. The system of claim 13, wherein the control platform is further configured to allow an administrator to monitor the electronic message and the subsequent electronic message conversation.

18. The system of claim 13, wherein the control platform is further configured to perform the automated security scan of the electronic message by using language translation.

19. The system of claim 13, wherein the secure platform is further configured to verify payment for messages in the subsequent electronic message conversation, the payment based on a length of each of the messages in the subsequent electronic message conversation.

20. The system of claim 13, wherein the control platform is further configured to authenticate the user by determining that the user is the approved contact based on using one or more of an allowed contact list or a disallowed contact list.

* * * * *